United States Patent
Lee et al.

(10) Patent No.: US 8,346,609 B2
(45) Date of Patent: Jan. 1, 2013

(54) METHOD AND SOFTWARE FOR DISPLAYING ADVERTISEMENTS ON A WEB PAGE

(75) Inventors: Jong Won Lee, Seongnam-Si (KR); Zoo Il Yang, Uiwang-Si (KR); Eun Ja Byun, Osan-Si (KR)

(73) Assignee: NHN Business Platform Corporation, Seongnam-si (KR)

( * ) Notice: Subject to any disclaimer, the term of this patent is extended or adjusted under 35 U.S.C. 154(b) by 933 days.

(21) Appl. No.: 12/332,237

(22) Filed: Dec. 10, 2008

(65) Prior Publication Data

US 2009/0099934 A1   Apr. 16, 2009

Related U.S. Application Data

(63) Continuation of application No. PCT/KR2007/002691, filed on Jun. 4, 2007.

(30) Foreign Application Priority Data

Jun. 16, 2006  (KR) .................. 10-2006-0054311

(51) Int. Cl.
*G06Q 30/00* (2012.01)
*G05B 19/418* (2006.01)

(52) U.S. Cl. ............ 705/14.73; 705/14.4; 705/14.49; 709/218

(58) Field of Classification Search ............ 705/14
See application file for complete search history.

(56) References Cited

U.S. PATENT DOCUMENTS

| | | | |
|---|---|---|---|
| 6,714,975 B1* | 3/2004 | Aggarwal et al. ............ 709/224 |
| 2005/0049765 A1* | 3/2005 | Chetia et al. .................. 701/29 |
| 2005/0086105 A1* | 4/2005 | McFadden et al. ............ 705/14 |
| 2007/0078714 A1* | 4/2007 | Ott et al. ........................ 705/14 |
| 2008/0102947 A1* | 5/2008 | Hays et al. ..................... 463/31 |
| 2008/0126515 A1* | 5/2008 | Chambers et al. ............ 709/218 |
| 2009/0265243 A1* | 10/2009 | Karassner et al. ......... 705/14.54 |

FOREIGN PATENT DOCUMENTS

JP   2002-049842   2/2002
(Continued)

OTHER PUBLICATIONS

Mitchener, Brandon. "Web Sites Can't Stomach EU's Cookie-Ban Plan," Wall Street Journal, Nov. 12, 2001.*
"Colorado Company Trying to Centralize Online Advertising". Carly Schulaka,. Daily Camera Jul. 21, 1997.*

*Primary Examiner* — Victoria Vanderhorst
(74) *Attorney, Agent, or Firm* — H.C. Park & Associates, PLC

(57) ABSTRACT

Some embodiments disclosed herein are a method and a system for displaying an advertisement on a web page in which advertisement data displayed on the same web page from among different advertisement data can check mutual existence of the displayed advertisement data, thereby displaying another advertisement data different from the displayed advertisement data. The method for displaying another advertisement data includes recording and maintaining advertisement data including respective identification numbers in an advertisement database, loading the advertisement data from the advertisement database to a local computer memory of a user connected with a web page, identifying advertisement data having an identification number among the advertisement data loaded to the local computer memory, identifying predetermined option which may comprise predetermined display advertisement data from the advertisement database when the advertisement data having the identification number exists, and displaying the display advertisement data on the web page.

19 Claims, 6 Drawing Sheets

FOREIGN PATENT DOCUMENTS

| | | |
|---|---|---|
| JP | 2002-287673 | 10/2002 |
| JP | 2003-051797 | 2/2003 |
| JP | 2003-186787 A | 7/2003 |
| JP | 2006-113745 | 4/2006 |
| KR | 10-2002-0029528 A | 4/2002 |
| KR | 10-2002-0067609 A | 8/2002 |
| KR | 10-2004-0041661 A | 5/2004 |

\* cited by examiner

METHOD AND SOFTWARE FOR DISPLAYING ADVERTISEMENTS ON A WEB PAGE

CROSS-REFERENCE TO RELATED PATENT APPLICATIONS

This application is a continuation application under 35 U.S.C. §365(c) of International Application No. PCT/KR2007/002691, filed Jun. 4, 2007 designating the United States. This application further claims the benefit of the earlier filing date under 35 U.S.C. §365(b) of Korean Patent Application No. 10-2006-0054311 filed Jun. 16, 2006. This application incorporates herein by reference International Application No. PCT/KR2007/002691 and Korean Patent Application No. 10-2006-0054311 in their entirety.

BACKGROUND

1. Field

The present invention relates to a method and a system for displaying an advertisement on a web page.

2. Discussion of the Related Technology

Generally, advertising means information activities in which individuals, companies, or groups publicly announce goods, services, ideas, policies, and the like, to attain specified purposes as its dictionary definition. The advertising is provided to the public in the form of letters, pictures, voices, and the like through public media such as television, radio, the Internet, and the like, thereby effectively advertising goods, services, and the like, to the public.

Of multiple public media, in particular, the Internet is used in daily activities by a number of users regardless of location, sex, and age, and thus, purposes of advertising can be effectively attained through the Internet. This may be because a main purpose of using the Internet is to obtain desired information. Accordingly, when a search word of desired information is inputted, corresponding information may be provided at the same time related advertisement is provided, thereby maximizing advertising effect. In this regard, as one of advertising methods directed to maximizing advertising effect, a method for simultaneously displaying advertisement data associated with an identical product or service to thereby draw attention of a user has been suggested. However, such a method has a shortcoming in that the user is likely to tire of identical advertisements through drawing attention of the user by simultaneously providing the identical advertisements.

SUMMARY

One aspect of the invention provides a method of processing data for displaying a web page on a terminal. The method comprises: accessing, at a terminal, a server of a web page via the Internet; receiving, from the server, data for displaying the web page comprising a plurality of advertisements arranged thereon, each of the plurality of advertisements advertising for a product or service; determining, at the terminal, whether any two of the plurality of advertisements advertise for the same product or service, which determines that a first one and a second one of the plurality of advertisements advertise for the same product or service; and subsequent to determining that the first and second advertisements advertise for the same product or service, displaying the web page on the terminal which does not include at least one of the first and second advertisements as originally included in the data for displaying the web page.

In the foregoing method, each advertisement may have information indicative of a product or service advertised therein, wherein determining may comprise whether any two of the plurality of advertisements have the same information. The web page displayed subsequent to determining may comprise a third advertisement in replacement of at least one of the first and second advertisements. The third advertisement may advertise for the same product or service as the first and second advertisements. The third advertisement may comprise information contained in at least one of the first and second advertisements. The web page displayed subsequent to determining may comprise only one of the first and second advertisements while not comprising the other. The web page displayed subsequent to determining may comprise at least one of the first and second advertisements in a location(s) of the web page other than as originally included in the data for displaying the web page. The web page displayed subsequent to determining may comprise one of the first and second advertisements substantially smaller or larger than as originally included in the data for displaying the web page.

Further, the foregoing method may further comprise generating a pop-up window which may comprise an advertisement along with displaying the web page. The advertisement included in the pop-up window may comprise at least one of the first and second advertisements or a third advertisement. The web page displayed subsequent to determining may comprise at least one selected from the group consisting of: a third advertisement in replacement of at least one of the first and second advertisements; only one of the first and second advertisements while not comprising the other; at least one of the first and second advertisements in a location(s) of the web page other than as originally included in the data for displaying the web page; a modified version(s) of at least one of the first and second advertisements; and one of the first and second advertisements substantially larger or smaller than as originally included in the data for displaying the web page.

Still further, the foregoing method may further comprise: prior to determining, displaying the web page as originally included in the data for displaying the web page. In the foregoing method, the at least one of the first and second advertisements may be removed, replaced with at least one other advertisement, or modified from as originally included in the data for displaying the web page. The method may further comprise: subsequent to determining and prior to displaying, sending a notification to the server or another computer associated with the web page, notifying that the first and second advertisements advertise for the same product or service. The method may further comprise: receiving, from the server or the other computer, a command for at least one selected from the group consisting of: removing the at least one of the first and second advertisements from the data for displaying the web page, replacing the at least one of the first and second advertisements with at least one other advertisement, and modifying the at least one of the first and second advertisements from the data for displaying the web page so as to generate a third advertisement or to display a modified version(s) of the at least one of the first and second advertisements.

Still further, the method may further comprise: receiving, from the server or the other computer, a command for at least one selected from the group consisting of: including, on the web page, a third advertisement in replacement of at least one of the first and second advertisements; including, on the web page, only one of the first and second advertisements while not including the other; including, on the web page, at least one of the first and second advertisements in a location(s) of the web page other than as originally included in the data for displaying the web page; including, on the web page, a modified version(s) of at least one of the first and second advertisements; and including, on the web page, one of the first and second advertisements substantially larger or smaller than as originally included in the data for displaying the web page.

Another aspect of the invention provides a computer program executable in a terminal in communication with a server of a web page for displaying the web page along with a plurality of advertisements. The program comprises: an identification module configured to identify, in data for displaying the web page and the plurality of advertisements, information indicative of a product or service that each advertisement advertises therein; a determination module configured to determine whether any two or more of the plurality of advertisements advertise for the same product or service; a communication module configured to send a notification to the server or another computer associated with the web page, notifying that first and second advertisements are to advertise for the same product or service and further to receive a command from the server to make changes in the data for displaying the web page; an advertisement modification module configured to make changes in the data for displaying the web page; and a display module configured to coordinate displaying of a modified version of the web page.

Still another aspect of the invention provides a method of running on-line advertisement. The method comprises: sending, to a terminal, data for displaying a web page, which includes a plurality of advertisements comprising a first advertisement and a second advertisement, each of the plurality of advertisements advertising for a product or service; receiving, from the terminal, a notification notifying that the first and second advertisements advertise for the same product or service; retrieving a predetermined option to remedy a situation in which two or more advertisements advertising for the same product or service are chosen for displaying on the web page at the same time; and sending, to the terminal, a command to implement the predetermined option such that the terminal to displays the web page in accordance with the predetermined option.

The foregoing method may further comprise: sending, to the terminal, data necessary for implementing the predetermined option. The method may further comprise: providing an advertisement database comprising advertisements that are to be included in the data for displaying the web page, wherein the advertisement database may further comprise predetermined options for remedying the situation in which two or more advertisements advertising for the same product or service are chosen for displaying on the web page at the same time, wherein the predetermined option may be retrieved from the advertisement database. The predetermined option may comprise at least one selected from the group consisting of: including, on the web page, a third advertisement in replacement of at least one of the first and second advertisements; including, on the web page, only one of the first and second advertisements while not including the other; including, on the web page, at least one of the first and second advertisements in a location(s) of the web page other than as originally included in the data for displaying the web page; including, on the web page, a modified version(s) of at least one of the first and second advertisements; and including, on the web page, one of the first and second advertisements substantially larger or smaller than as originally included in the data for displaying the web page.

An aspect of the present invention provides a method and a system for displaying another advertisement data in which whether advertisement data displayed on the same webpage from among mutually different advertisement data has an identical identification number is verified, so that another advertisement data completely different from the advertisement data is displayed, thereby maximizing advertising effect.

An aspect of the present invention provides a method and a system for displaying another advertisement data in which an identification number of advertisement data loaded to a local computer memory of a user is identified, so that when advertisement data having the identical identification number exists, another display advertisement data associated with the advertisement data is displayed on the same webpage.

An aspect of the present invention provides a method and a system for displaying another advertisement data in which either one advertisement data from either first or second advertisement data having an identical identification number, or third advertisement data completely different from the first and the second advertisement data is displayed on the same webpage, so that attention of a user is drawn, thereby relatively increasing advertising effects in comparison with a method for simultaneously displaying identical advertisement data.

An aspect of the present invention provides a method and a system for displaying another advertisement data in which first and second advertisement data having an identical identification number are transformed, so that the transformed first and second advertisement data is displayed on either a first advertisement area corresponding to an original advertisement area or an enlarged second advertisement area.

According to another aspect of the present invention, there is provided a method for displaying another advertisement data on a web page comprising recording and maintaining advertisement data including respective identification numbers in an advertisement database, loading the advertisement data from the advertisement database to a local computer memory of a user connected with a web page, identifying an identification number of the advertisement data loaded to the local computer memory, identifying predetermined display advertisement data from the advertisement database when the advertisement data having the identification number exists, and displaying the display advertisement data on the webpage.

According to another aspect of the present invention, there is provided a system for displaying another advertisement data comprising an advertisement database configured to record and maintain advertisement data including respective identification numbers, an advertisement data loading unit configured to load the advertisement data from the advertisement database to a local computer memory of a user connected with a web page, an identification number identifying unit configured to identify advertisement data having an identification number among advertisement data loaded to the local computer memory, an advertisement data identifying unit configured to identify predetermined display advertisement data from the advertisement database, when the advertisement data having the identical identification number exists, and a display unit configured to display the display advertisement data on the webpage.

DETAIL DESCRIPTION OF EMBODIMENTS

Figure 1:
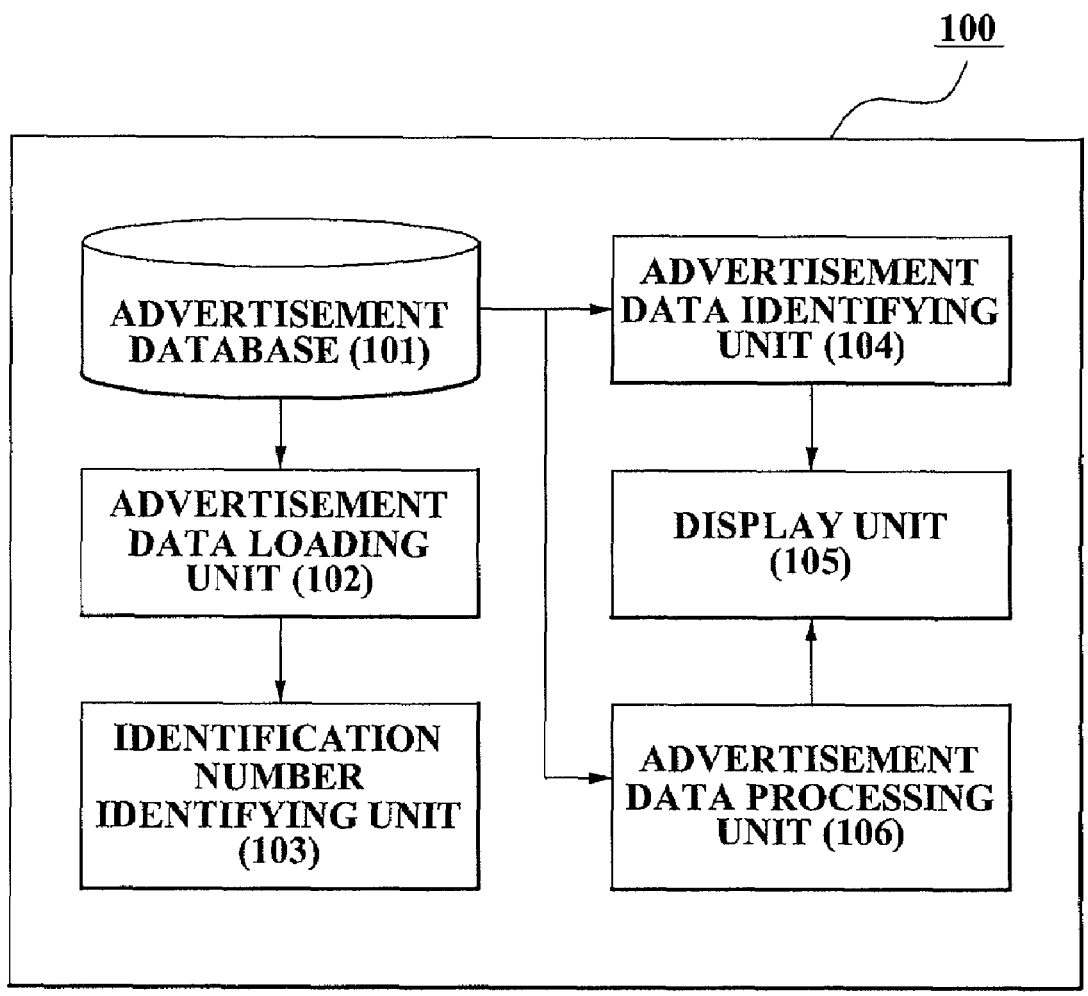
FIG. 1 is a block diagram illustrating a system for displaying another advertisement data according to an exemplary embodiment of the present invention.

Reference will now be made in detail to certain embodiments of the present invention, examples of which are illustrated in the accompanying drawings, wherein like reference numerals refer to the like elements throughout. These embodiments are described below in order to explain the present invention by referring to the figures.

FIG. 1 is a block diagram illustrating a system for displaying another advertisement data according to an exemplary embodiment of the present invention.

As illustrated in FIG. 1, a system 100 for displaying another advertisement data may include an advertisement database 101 configured to record and maintain advertisement data including information of a product or service that each advertisement advertises for. In some examples, information of the advertising product or service can be provided as an identification number. In addition, a system 100 may further comprise an advertisement data loading unit 102 configured to load the advertisement data from the advertisement database 101 to a local computer memory of a user connected on a web page, an identification number identifying unit 103 configured to identify advertisement data having an identification number among advertisement data loaded on the local computer memory, an advertisement data identifying unit 104 configured to identify a predetermined option such as predetermined display advertisement data from the advertisement database, when the advertisement data having the identical identification number exists, and/or a display unit 105 is configured to display the display advertisement data on the web page.

According to the some exemplary embodiments, the advertisement database 101 maintains third advertisement data associated with first and second advertisement data having an identical identification number, and the advertisement data identifying unit 104 identifies the third advertisement data from the advertisement database 101 as the display advertisement data when advertisement data colliding on the same web page correspond to the first and the second advertisement data.

Also, according to another exemplary embodiment of the present invention, the advertisement data identifying unit 104 identifies one advertisement data from either the first or the second advertisement data as advertisement data to be intended to be displayed on the web page.

Further, according to still another exemplary embodiment of the present invention, the system 100 may further include an advertisement data processing unit 106 configured to generate third advertisement data by transforming or modifying the first and the second advertisement data having an identical identification number. In this instance, the display unit 105 displays the generated third advertisement data on an advertisement area of the web page.

In addition, according to still another exemplary embodiment, the display unit 105 displays the third advertisement data on an enlarged second advertisement area in addition to a first advertisement area corresponding to an original advertisement area of the web page.

In certain exemplary embodiments of the invention, whether two or more advertisements displayed on the same web page have an identical identification number is verified, and then advertisement data of the at least one of the two or more advertisements that advertise the same product or service are modified, so that a third advertisement from the modified advertisement data is displayed on an advertisement area of a web page.

Figure 2:
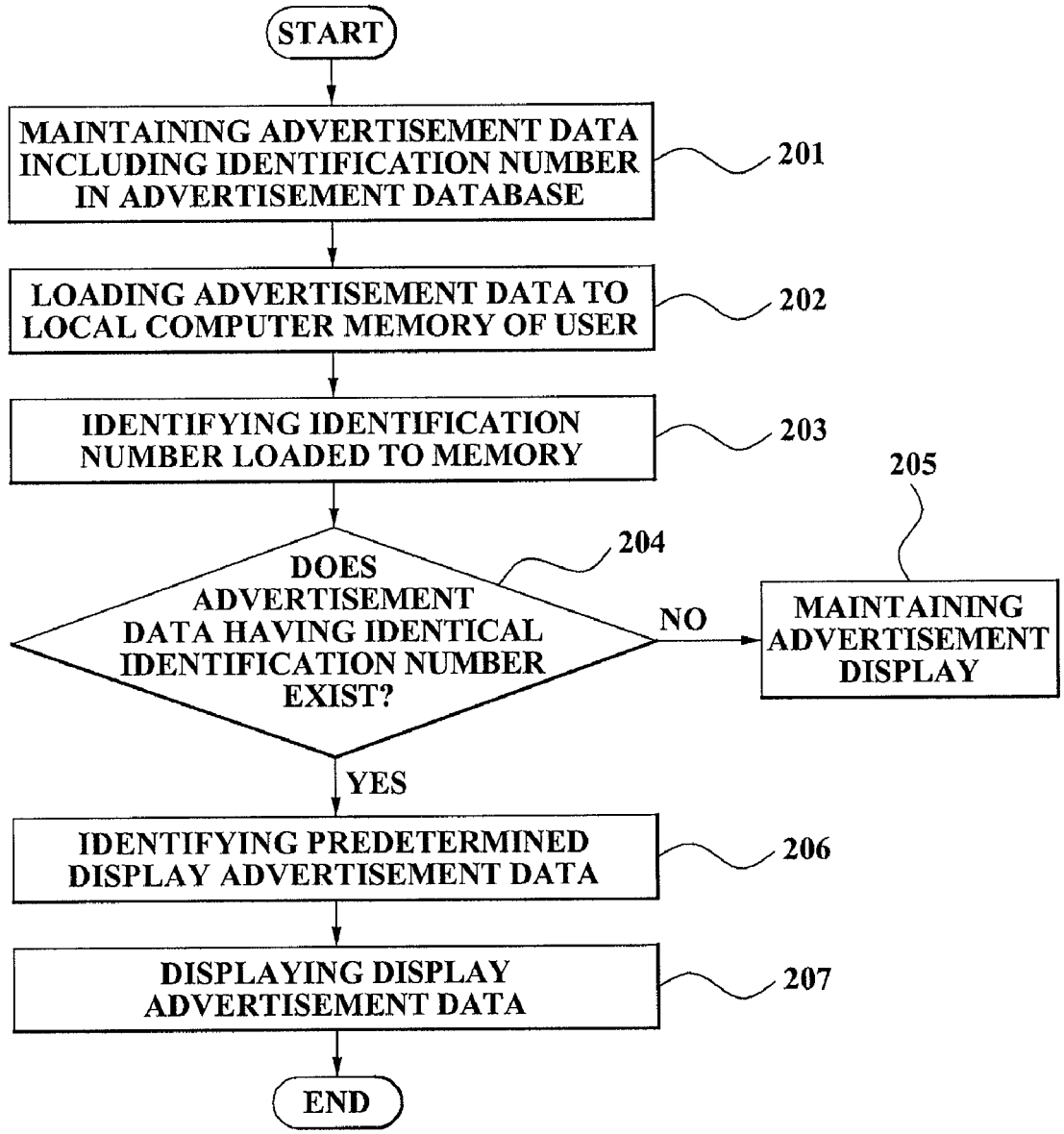
FIG. 2 is a flowchart illustrating a method for displaying another advertisement data according to another exemplary embodiment of the present invention.

FIG. 2 is a flowchart illustrating a method for displaying another advertisement data according to another exemplary embodiment of the present invention. The method for displaying another advertisement data according to the present exemplary embodiment of the invention is performed by the system 100 for displaying another advertisement data as described with reference to FIG. 1.

In operation 201, the advertisement database 101 of the system 100 records and maintains advertisement data including respective identification numbers in the advertisement database. The identification number can serve as an identifier for identifying advertisement data. Thus, advertisements with respect to an identical item (e.g. goods, products or services) have an identical identification number, and conversely, advertisement with respect to mutually different items have mutually different identification numbers. For example, when five advertisement data such as A, B, C, D, and E with respect to an identical advertisement item for advertising a web search engine named "NAVER" exists, types of advertisement data of the A, B, C, D, and E are different, however, identification numbers of the A, B, C, D, and E may be the same. In this manner, the advertisement database 101 provides an identical identification number with respect to an identical goods, product and/or service, and thus records different advertisement data.

According to another exemplary embodiment of the present invention, the advertisement database 101 maintains third advertisement data associated with first and second advertisement data having an identical identification number. Specifically, the advertisement database 101 maintains another advertisement data associated with the first and the second advertisement data having the identical identification number.

In operation 202, the advertisement data loading unit 102 of the system 100 can load advertisement data stored in the advertisement database 101 to the local computer memory of a user connected on a web page. According to the present exemplary embodiment, the system 100 loads data required for a basis configuration of the web page to the local computer of the user in order to provide a web page to a web browser of the user. For example, the system 100 stores data required for each portion of a web page in the local computer of the user in advance. The web page is categorized into a text field, an inputting field, an image field, an advertisement field, and the like. According to the present exemplary embodiment of the invention, advertisement data displayed on the web page is loaded to the local computer memory of the user, so that an identification number of advertisement data loaded to the memory is identified.

According to another exemplary embodiment of the invention, the system 100 may display different advertisement data for either connecting every time to a web page or a predetermined time period. In such a method for displaying another advertisement data as described above, different advertisement data stored in the advertisement database 101 is loaded, and thus, different advertisement data is displayed every time being viewed by a user. As a result, the system 100 may load different advertisement data stored in the advertisement database 101 to the local computer memory of the user in real time.

In operation 203, the identification number identifying unit 103 of the system 100 identifies an identification number of advertisement data loaded to the local computer memory of the user. For example, the identification number identifying unit 103 identifies whether advertisement data is associated with an identical advertisement item by identifying an identification number of the advertisement data. When two or more advertisement data having an identical identification number are detected, the identification number identifying unit 103 may transmit the advertisement data having an identical identification number to the advertisement data identifying unit 104.

According to another exemplary embodiment of the invention, the advertisement data broadcasts an identification number to the local computer of the user, thereby retrieving an identical identification number. The advertisement data retrieves an identical identification number from among signals broadcasted, and identifies advertisement data having an identical identification number.

In some illustrative examples, in operation 204, the system 100 can determine whether advertisement data having an identical identification number from among advertisement data displayed on the same web page exists. In some cases, when the advertisement data having an identical identification number exists, operation 206 can be performed, and conversely, when the advertisement data having an identical identification number does not exist, operation 205 can be performed.

According to another exemplary embodiment of the invention, the system 100 verifies an identification number before displaying advertisement data, and displays another advertisement data on a web page with respect to at least two advertisement data having an identical identification number. Alternatively, the system 100 can verify an identification number after displaying advertisement data, and displays another advertisement data on a web page with respect to the already displayed advertisement data that have two or more advertisements having an identical identification number.

Thus, in some embodiments, in operation 205, the system 100 previously may display advertisement data, and maintain displaying the displayed advertisement data when the displayed advertisement data does not have an identical identification number.

In some other embodiments, in operation 206, the advertisement data identifying unit 104 of the system 100 can identify predetermined display advertisement data from the advertisement database 101.

According to another exemplary embodiment of the invention, the system 100 can identify third advertisement data from the advertisement database 101 when first and second advertisement data having the same identification number collide on the same web page. Here, the third advertisement data may be different from the first and the second advertisement data. For this purpose, the system 100 can record and maintain third advertisement data in associated with the first and the second advertisement data having an identical identification number, in the advertisement database 101. Otherwise, the system 100 may maintain the third advertisement data in associated with the first advertisement data and fourth advertisement data having the identical identification number, in the advertisement database 101.

According to another exemplary embodiment of the invention, in order to increase advertising effects, the third advertisement data may be obtained by transforming or modifying the first and the second advertisement data. Specifically, the first and the second advertisement data are generated to have an identical advertisement item (goods, products or services), however, there may be no association between the first and the second advertisement data. Thus, the third advertisement data may be generated by slightly transforming the first and the second advertisement data in such a manner as to increase association between the first and the second advertisement data.

Also, according to still some other exemplary embodiments of the invention, the system 100 may generate third advertisement data by transforming or modifying the first and the second advertisement data in the advertisement data processing unit 106, instead of maintaining another third advertisement data associated with the first and the second advertisement data in the advertisement database 101. The advertisement data processing unit 106 may generate the third advertisement data in such a manner as to increase association between the first and the second advertisement data.

Further, the advertisement data processing unit 106 may transform the first and the second advertisement data, respectively, in such a manner as to increase association between the first and the second advertisement data.

Also, according to some exemplary embodiments of the invention, the system 100 can identify one advertisement data from either the first advertisement data or the second advertisement data as the display advertisement data. For example, the system 100 identifies the first advertisement data as the display advertisement data when the first and the second advertisement data collide once, identifies the second advertisement data as the display advertisement data when they collide for a second time, and again identifies the first advertisement data as the display advertisement data when they collide for a third time. Otherwise, the system 100 may identify the second advertisement as the display advertisement data when the first and the second advertisement data collide once, identify the first advertisement data as the display advertisement data when they collide for a second time, and again identify the second advertisement data as the display advertisement data when they collide for a third time.

As described above, in some embodiments, the advertisement data processing unit 106 of the system 100 may transform one advertisement data, which has been identified as the display advertisement data, from either the first or the second advertisement data.

In some embodiments, in operation 207, the display unit 105 of the system 100 can display the display advertisement data on the web page.

According to one exemplary embodiment of the invention, the display unit 105 may display the third advertisement data on an advertisement area of the web page. In this instance, the display unit 105 may display the third advertisement data on an enlarged advertisement area in addition to a first advertisement area corresponding to an original advertisement area of the web page.

Also, according to another exemplary embodiment of the invention, the display unit 105 may display the transformed or modified first advertisement data on the first advertisement area of the web page, and display the transformed or modified second advertisement data on the second advertisement area of the web page, respectively. Otherwise, the display unit 105 may display the modified first and second advertisement data on an enlarged second advertisement area in addition to a first advertisement area corresponding to an original advertisement area of the web page.

Figure 3:
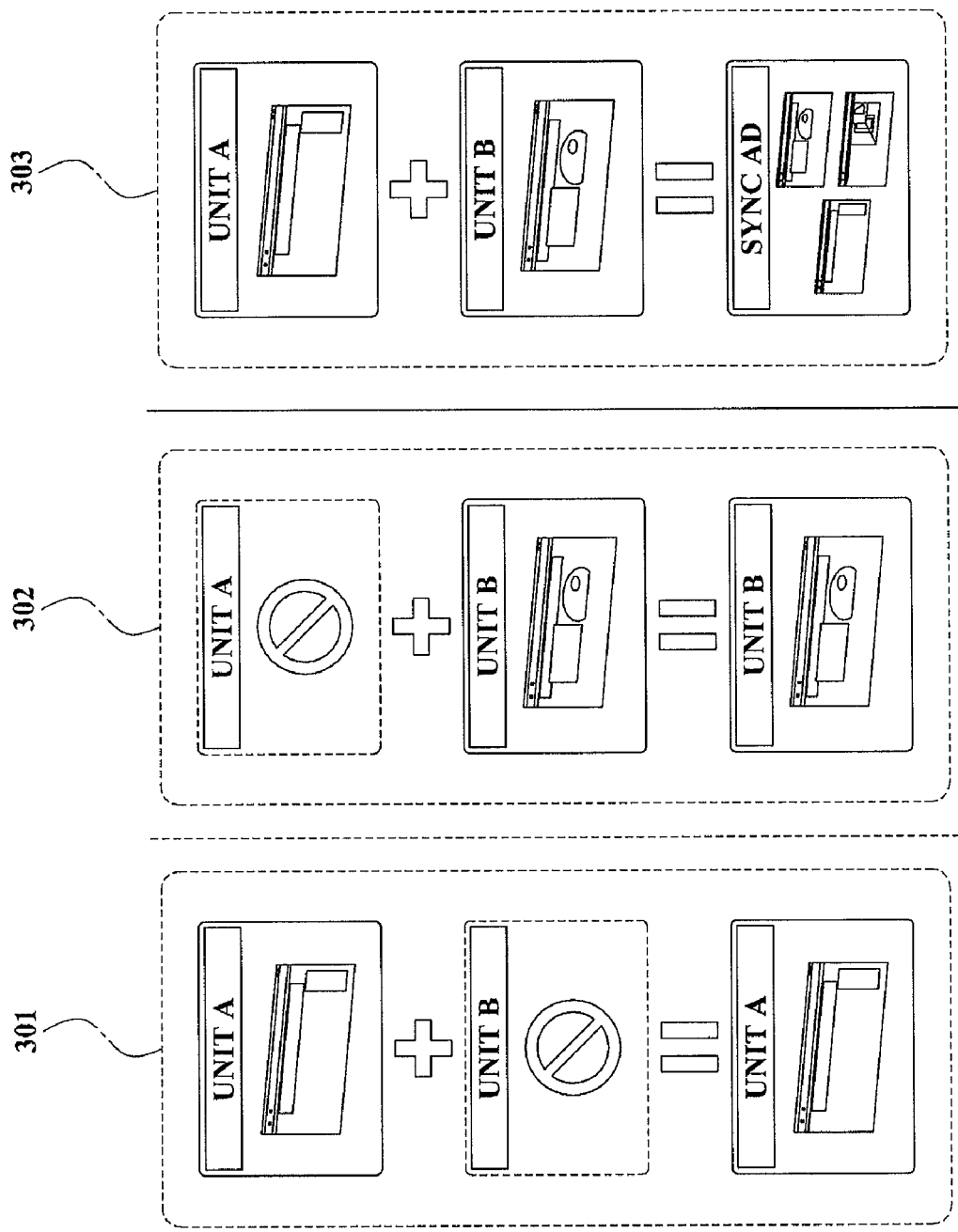
FIG. 3 illustrates an example for identifying display advertisement data in a system for displaying another advertisement data according to an exemplary embodiment of the present invention.

FIG. 3 illustrates an example for identifying display advertisement data in a system for displaying another advertisement data according to an exemplary embodiment of the present invention.

As illustrated with respect to the reference segment 301, when advertisement data "A" and advertisement data "B" collide on the same web page, the system 100 may identify According to some embodiments, the method for displaying another advertisement data can be recorded in a computer-readable recording media including program instructions to implement various operations embodied by a computer. The computer-readable medium may include program instructions, data files, a data structure or a combination thereof. The program instructions recorded in the computer-readable medium may be specially designed and constructed for some embodiments of the present invention, or be well known to those skilled in the field of computer software. Examples of computer-readable medium include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The hardware devices may be constructed to act as one or more software modules for performing the operation of the present invention, and vice versa.

As described above, according to some embodiments of the method and the system for displaying an advertisement on a web page, whether advertisement data displayed on the same web page from among different advertisement data has an identical identification number can be verified, so that another advertisement data different from the advertisement data can be displayed, thereby maximizing advertising effect.

Also, according to some other embodiments, an identification number of advertisement data loaded to a local computer memory of a user can be identified, so that when advertisement data having the identical identification number exists, another display advertisement data associated with the advertisement data can be displayed on the same web page.

According to other embodiments, one advertisement data from either first or second advertisement data having an identical identification number, or third advertisement data different from the first and the second advertisement data is displayed on a web page, so that the advertisement data "A" as the display advertisement data intended to be displayed on the web page.

As illustrated with respect to the reference segment 302, when advertisement data "A" and advertisement data "B" collide on the same web page, the system 100 may identify the advertisement data "B" as the display advertisement data intended to be displayed on the web page.

As illustrated with respect to the reference segment 303, when advertisement data "A" and advertisement data "B" collide on the same web page, the system 100 may identify another advertisement data (sync AD) as the display advertisement data intended to be displayed on the web page.

Figure 4:
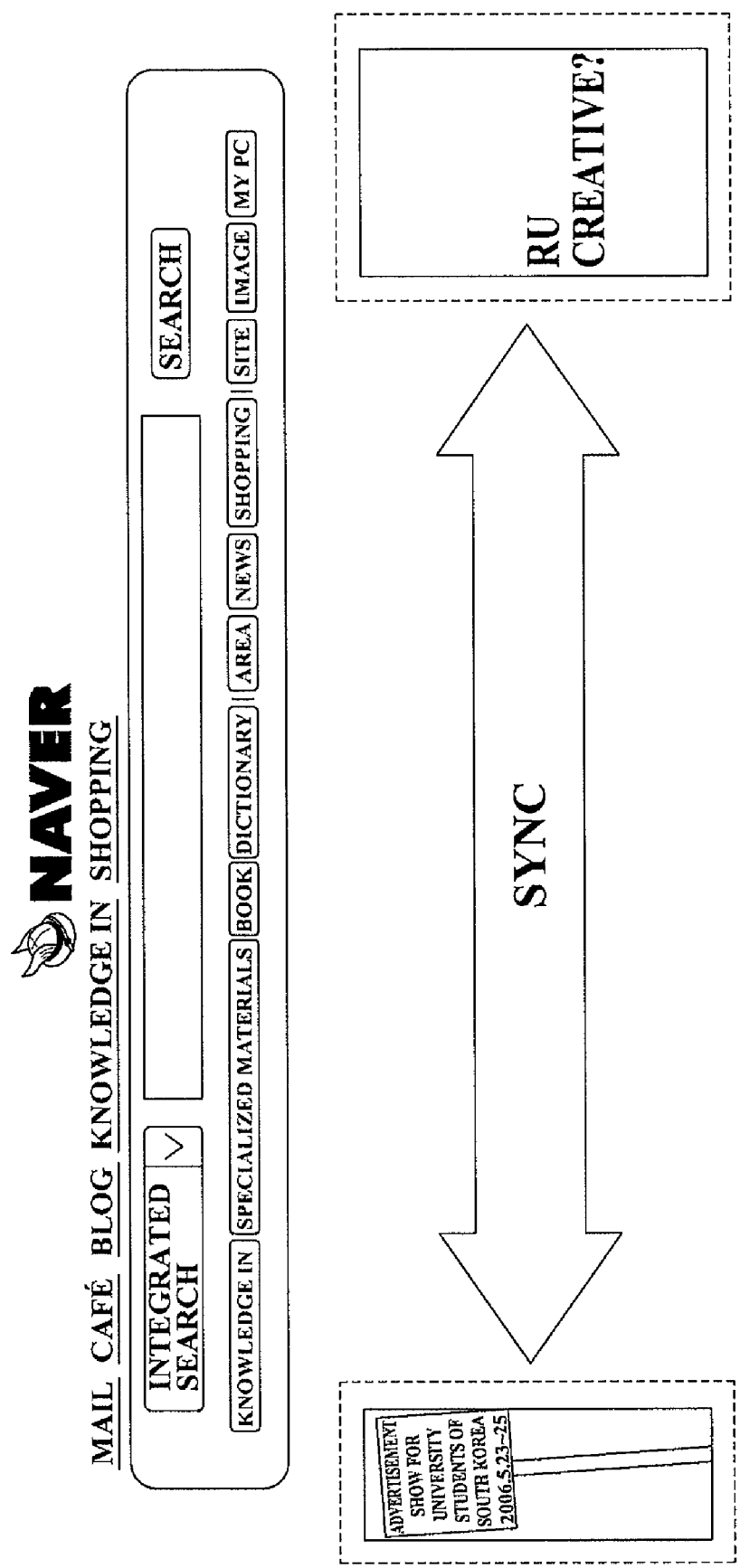
FIG. 4 illustrates an example for displaying another advertisement data having an identical identification number on the same webpage in a system for displaying another advertisement data according to an exemplary embodiment of the present invention.

FIG. 4 illustrates an example for displaying advertisement data having an identical identification number on the same web page in a system for displaying another advertisement data according to an exemplary embodiment of the present invention.

As illustrated in FIG. 4, the system 100 may display first advertisement data on a first advertisement area (left-hand side), and second advertisement data on a second advertisement area (right-hand side), with respect to first and second advertisement data having an identical identification number.

Figure 5:
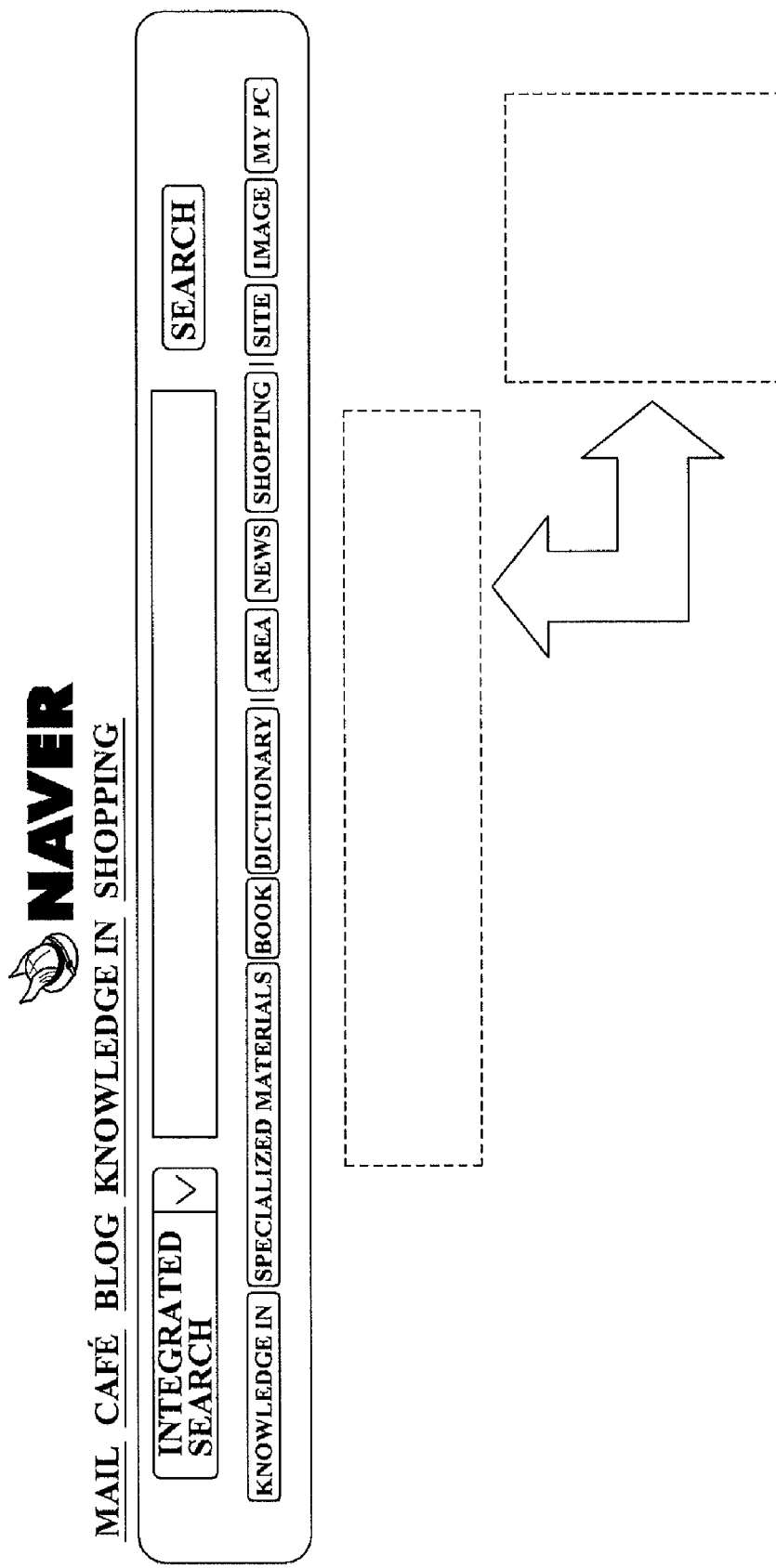
FIGS. 5 and 6 illustrate an example for displaying another advertisement data by adjusting an advertisement area and an advertisement size in a system for displaying another advertisement data according to an exemplary embodiment of the present invention.
Figure 6:
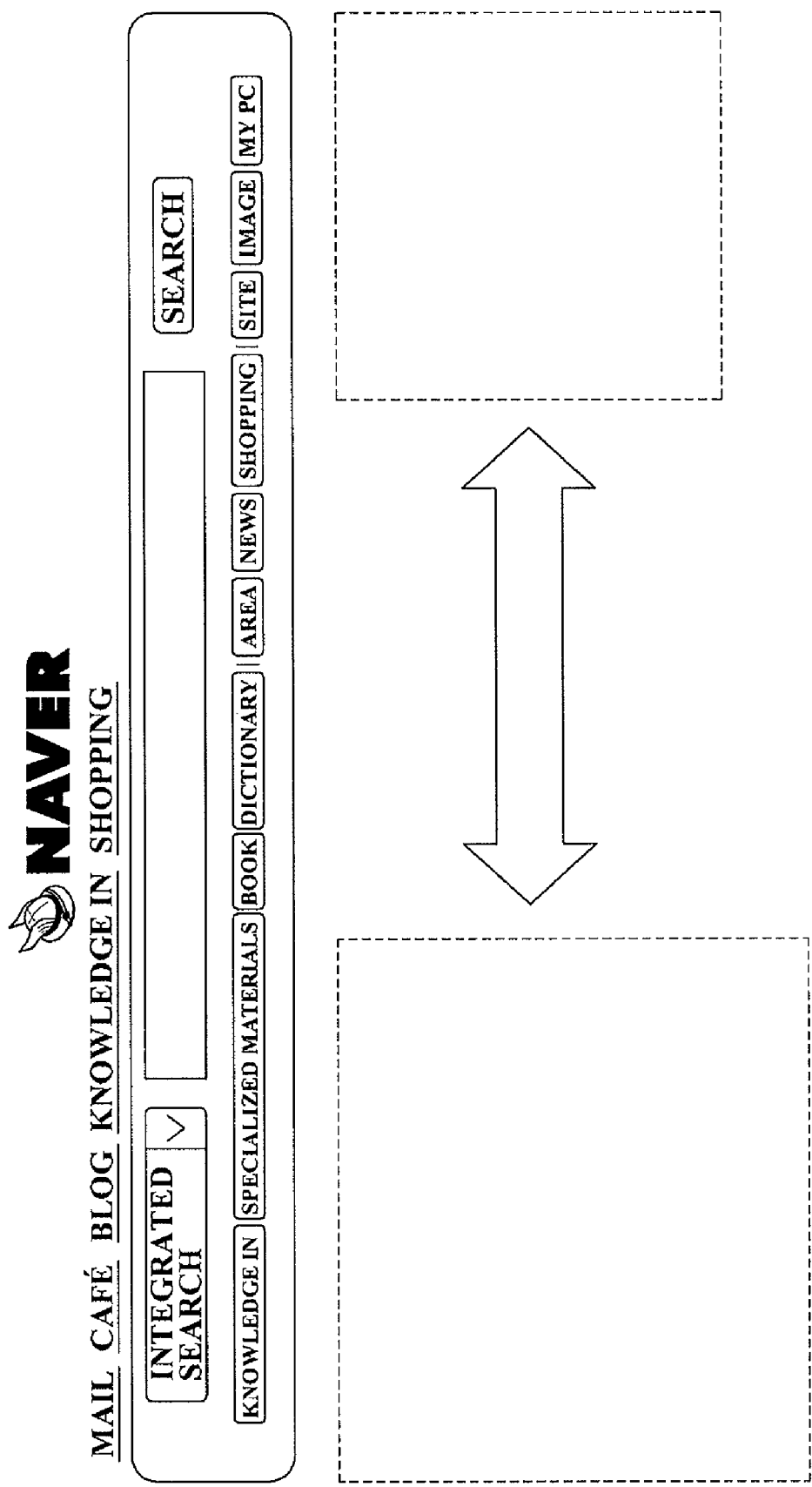

FIGS. 5 and 6 illustrate some examples for displaying advertisement data by adjusting an advertisement area and an advertisement size in a system for displaying another advertisement data according to an exemplary embodiment of the present invention.

As illustrated in FIG. 5, the system 100 may display first and second advertisement data having an identical identification number by setting a first advertisement area to "center", and a second advertisement area to "right-hand side", respectively.

Also, as illustrated in FIG. 6, the system 100 may display first and second advertisement data having an identical identification number by setting a first advertisement area to "left-hand side" which occupies a relatively enlarged area, and a second advertisement area to "right-hand side" which occupies a relatively downsized area.

Although not shown in drawings, the system 100 may display advertisement data having an identical identification number on a center of a web page in a type of a pop up window. advertising effects can be relatively increased in comparison with a method for simultaneously displaying identical advertisement data.

In further other embodiments, the method and the system for displaying an advertisement on a web page may comprise modification of at least one of first and second advertisements wherein the first and second advertisements have the same identification number. Therefore, the modified advertisement data is displayed on either a first advertisement area corresponding to an original advertisement area or an enlarged second advertisement area.

Although only part of embodiments of the present invention have been shown and described herein, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of processing data for displaying a web page on a terminal, the method comprising:
    accessing, at a terminal, a server of a web page;
    receiving, from the server, data for displaying the web page comprising a plurality of advertisements arranged thereon, each of the plurality of advertisements advertising for a product or service;
    determining, at the terminal and prior to display of the web page on the terminal, whether any two of the plurality of advertisements, referred to as a first one and a second one of the plurality of advertisements, advertise for the same product or service; and
    subsequent to determining that the first and second advertisements advertise for the same product or service, displaying the web page on the terminal without displaying at least one of the first and second advertisements as originally included in the data for displaying the web page, wherein the web page displayed subsequent to determining comprises a third advertisement which replaces at least one of the first and second advertisements.

2. The method of claim 1, wherein each advertisement has information indicative of a product or service advertised therein, wherein determining comprises whether any two of the plurality of advertisements have the same information.

3. The method of claim 1, wherein the third advertisement advertises for the same product or service as the first and second advertisements.

4. The method of claim 1, wherein the third advertisement comprises information contained in at least one of the first and second advertisements.

5. The method of claim 1, wherein the web page displayed subsequent to determining displays only one of the first and second advertisements while not displaying the other.

6. The method of claim 1, wherein the web page displayed subsequent to determining displays at least one of the first and second advertisements in a location(s) of the web page other than as originally included in the data for displaying the web page.

7. The method of claim 1, wherein the web page displayed subsequent to determining displays one of the first and second advertisements substantially larger than as originally included in the data for displaying the web page.

8. The method of claim 1, further comprising:
generating a pop-up window comprising an advertisement along with displaying the web page.

9. The method of claim 8, wherein the advertisement included in the pop-up window comprises at least one of the first and second advertisements or the third advertisement.

10. The method of claim 1, wherein the web page displayed subsequent to determining further comprises at least one selected from the group consisting of:
only one of the first and second advertisements;
at least one of the first and second advertisements in a location(s) of the web page other than as originally included in the data for displaying the web page;
a modified version(s) of at least one of the first and second advertisements; and
one of the first and second advertisements substantially larger or smaller than as originally included in the data for displaying the web page.

11. The method of claim 1, wherein the at least one of the first and second advertisements is removed, replaced with at least one other advertisement, or modified from as originally included in the data for displaying the web page.

12. The method of claim 1, further comprising:
subsequent to determining and prior to displaying, sending a notification to the server or another computer associated with the web page, which notifies that the first and second advertisements advertise for the same product or service.

13. The method of claim 12, further comprising:
receiving, from the server or the other computer, a command for at least one selected from the group consisting of:
removing the at least one of the first and second advertisements from the data for displaying the web page,
replacing the at least one of the first and second advertisements with at least one other advertisement, and
modifying the at least one of the first and second advertisements from the data for displaying the web page so as to generate the third advertisement or to display a modified version(s) of the at least one of the first and second advertisements.

14. The method of claim 13, further comprising:
receiving, from the server or the other computer, a command for at least one selected from the group consisting of:
including, on the web page, the third advertisement;
including, on the web page, only one of the first and second advertisements while not including the other;
including, on the web page, at least one of the first and second advertisements in a location(s) of the web page other than as originally included in the data for displaying the web page;
including, on the web page, a modified version(s) of at least one of the first and second advertisements; and
including, on the web page, one of the first and second advertisements substantially larger or smaller than as originally included in the data for displaying the web page.

15. A non-transitory computer readable medium having stored thereon a computer program executable in a terminal in communication with a server of a web page for displaying the web page along with a plurality of advertisements, the program comprising:
an identification module configured to identify, in data for displaying the web page and the plurality of advertisements, information indicative of a product or service that each advertisement advertises therein;
a determination module configured to determine, prior to display of the web page on the terminal, whether any two or more of the plurality of advertisements advertise for the same product or service;
a communication module configured to send a notification to the server or another computer associated with the web page, notifying that first and second advertisements are to advertise for the same product or service and further to receive a command from the server to make changes in the data for displaying the web page;
an advertisement modification module configured to make changes in the data for displaying the web page; and
a display module configured to coordinate displaying of a modified version of the web page that comprises a third advertisement which replaces at least one of the first and second advertisements.

16. A method of running on-line advertisement, the method comprising:
sending, to a terminal, data for displaying a web page, which includes a plurality of advertisements comprising a first advertisement and a second advertisement, each of the plurality of advertisements advertising for a product or service;
receiving, from the terminal and prior to display of the web page on the terminal, a notification notifying that the first and second advertisements advertise for the same product or service;
retrieving a predetermined option to remedy a situation in which two or more advertisements advertising for the same product or service are chosen for displaying on the web page at the same time; and
sending, to the terminal, a command to implement the predetermined option such that the terminal is to display the web page in accordance with the predetermined option, wherein the web page displayed subsequent to determining comprises a third advertisement which replaces at least one of the first and second advertisements.

17. The method of claim 16, further comprising:

sending, to the terminal, data necessary for implementing the predetermined option.

18. The method of claim 16, further comprising:

providing an advertisement database comprising advertisements that are to be included in the data for displaying the web page, wherein the advertisement database further comprises predetermined options for remedying the situation in which two or more advertisements advertising for the same product or service are chosen for displaying on the web page at the same time, wherein the predetermined option is retrieved from the advertisement database.

19. The method of claim 16, wherein the predetermined option comprises at least one selected from the group consisting of:

including, on the web page, the third advertisement;

including, on the web page, only one of the first and second advertisements while not including the other;

including, on the web page, at least one of the first and second advertisements in a location(s) of the web page other than as originally included in the data for displaying the web page;

including, on the web page, a modified version(s) of at least one of the first and second advertisements; and including, on the web page, one of the first and second advertisements substantially larger or smaller than as originally included in the data for displaying the web page.

* * * * *